A. L. BLOMFIELD.
APPARATUS FOR SEPARATING LIQUIDS FROM SOLIDS IN FLUID SUSPENSIONS.
APPLICATION FILED NOV. 13, 1915.
1,237,745.
Patented Aug. 21, 1917.
2 SHEETS—SHEET 1.
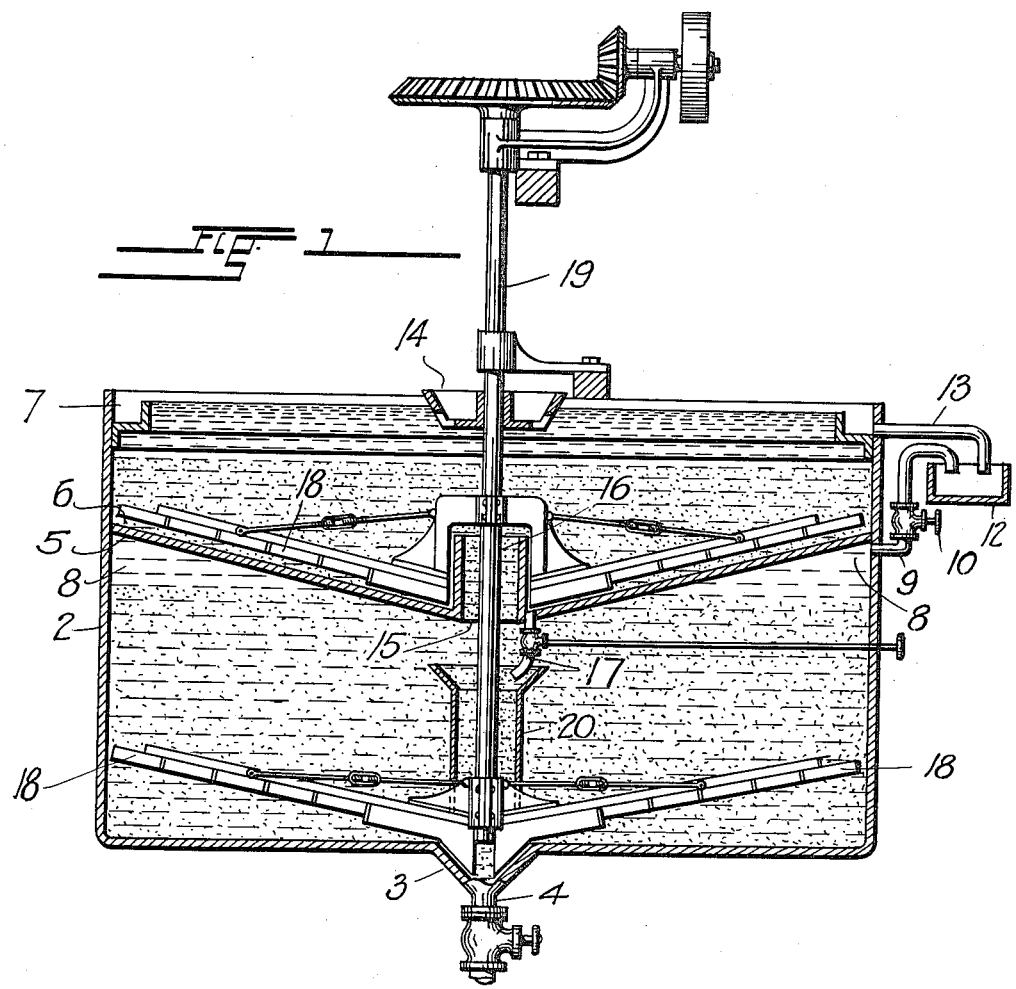
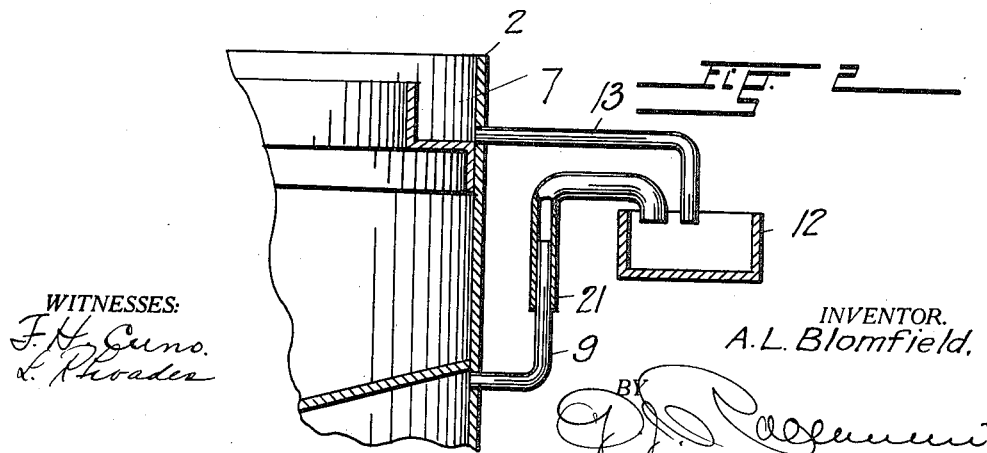
WITNESSES:
INVENTOR.
A. L. Blomfield.
BY
ATTORNEY.

A. L. BLOMFIELD.
APPARATUS FOR SEPARATING LIQUIDS FROM SOLIDS IN FLUID SUSPENSIONS.
APPLICATION FILED NOV. 13, 1915.
1,237,745.
Patented Aug. 21, 1917.
2 SHEETS—SHEET 2.
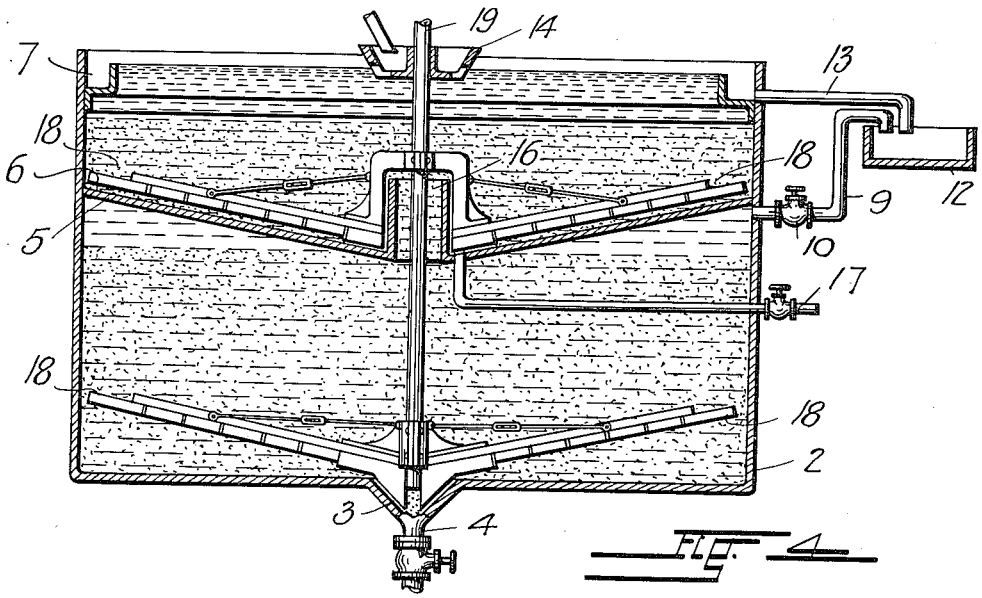
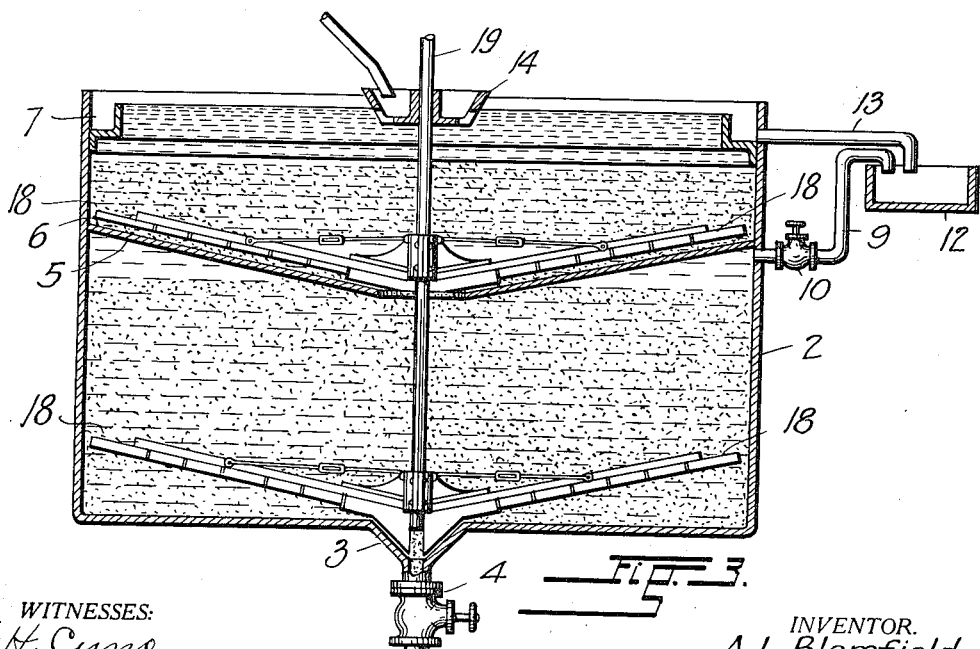
WITNESSES:
INVENTOR.
A. L. Blomfield.
ATTORNEY.

UNITED STATES PATENT OFFICE.

ALFRED L. BLOMFIELD, OF COLORADO SPRINGS, COLORADO, ASSIGNOR, BY MESNE ASSIGNMENTS, TO THE DORR COMPANY, A CORPORATION OF DELAWARE.

APPARATUS FOR SEPARATING LIQUIDS FROM SOLIDS IN FLUID SUSPENSIONS.

1,237,745.  Specification of Letters Patent.  Patented Aug. 21, 1917.

Application filed November 13, 1915. Serial No. 61,273.

*To all whom it may concern:*

Be it known that I, ALFRED L. BLOMFIELD, a subject of George V, King of Great Britain, but having declared my intention to become a citizen of the United States, residing at Colorado Springs, in the county of El Paso and State of Colorado, have invented certain new and useful Improvements in Apparatus for Separating Liquids from Solids in Fluid Suspensions, of which the following is a specification.

This invention relates to apparatus for separating liquid from solids in a fluid suspension of solids in liquid, and more particularly to apparatus for dividing solids from material, by what is commonly known as the continuous gravity settling process.

In this process the solid constituents of the material settle out of the liquid in which they are suspended, in a container provided with an outlet for the settling solids in a thickened condition, and with an overflow for comparatively clear liquid rising out of the thickened matter.

In the operation of apparatus of this character, it is essential that the settling solids thickened to a predetermined, regulatable degree of density, and the clearer liquid rising out of the subsiding matter, are separately and continuously discharged from the tank or vessel in which the separation process is carried on.

The primary object of the present invention is to provide in apparatus of the hereinbefore briefly described type, an association of devices which by synchronous treatment of separated quantities of material, multiplies the settling capacity of the apparatus without the use of separate containers, elevators or other conveying devices, and with but little increase in the mechanical energy required to singly operate an apparatus of ordinary settling capacity.

With the above and other objects in view, all of which will be fully disclosed in the course of the following description, my invention consists in combining in a single unit a series of separated settling areas designed to coöperate in the treatment of pulpous material, to extract the liquid constituents thereof and recover the solid matter in a thickened condition.

In the accompanying drawings have been illustrated different forms of apparatus for accomplishing the object of my invention, all based upon one principle and operating to produce by equivalent actions, one and the same result.

Essentially, my invention consists of a tank having a succession of superposed settling areas, means for feeding material to said areas, means for discharging the solids settling upon the areas in a thickened condition, and means for the automatic discharge of thinner liquid rising out of the settling solids above each settling area.

In association with the above enumerated essential features, my invention comprises devices for regulating the feed of material to the different settling surfaces by varying the volume of the discharge of liquid from above the same, means for regulating the discharge of the thickened matter, mechanism for moving the settling solids to the points of their discharge, and means to automatically proportionate the quantities of material between the settling surfaces.

My invention furthermore contemplates the automatic distribution of material to the different settling zones proportionate to the discharge of clear liquid from above the same, and the regulatable and restricted discharge of the thickened matter from the tank either at separate points or through one common outlet.

It will be seen from the foregoing brief description of my invention that by its use the capacity of settling apparatus of the type mentioned, is materially increased with a comparatively small advance in the cost of operation and without enlarging the superficial area of the container in which the process is carried on.

In the accompanying drawings in the various views of which like parts are similarly designated, Figure 1 represents a vertical section through a thickening apparatus embodying the improvements hereinbefore referred to, Fig. 2, a sectional view showing a modified method of regulating the discharge of liquid from the pockets in which it accumulates, Fig. 3, a section similar to Fig. 1 showing a modified construction of the apparatus, and Fig. 4, a sectional view similar to Fig. 1 showing a modified method of discharging the thickened matter from the upper settling surface.

Referring more specifically to the drawings, the reference numeral 2 designates a preferably cylindrical tank which at a central point of its bottom has a conical sump 3 in communication with a valve-controlled outlet 4. Adjoining the inner circumferential surface of the tank is a dished partition 5 which provides the supplemental settling surface 6 of the apparatus.

In this connection I desire it understood that while for simplicity in illustration, but one partition has been shown in the drawings, any desired number of partitions may be used within the limits of the dimensions of the tank.

The tank has at its upper end a peripheral launder 7 for the overflow of thin liquid rising from the solids settling toward the upper settling surface, and it has in connection with the apex of the annular pocket 8 formed beneath the partition, in which the thin liquid rising in the lower compartment of the tank accumulates, a discharge conduit 9 the flow through which is controlled by a valve 10.

The conduit is preferably bent upwardly to discharge into a launder 12 placed exteriorly of the tank, and a pipe 13 may be provided to conduct the contents of the overflow trough 7 into the same launder.

The material under treatment is fed into the tank through the intermediary of a feed box 14 placed centrally above the same, and the partition 5 has a central opening 15 to provide a passage for the material into the subjacent space.

In order to detain the solids settling upon the upper surface until they have thickened to the required density, and also to prevent the flow of thickened matter through the opening 15, the latter is surrounded by a boot or collar 16 which traps the thickened material while providing a passage for the material discharged from the feed-box into the space below the partition.

The thickened matter is discharged from the upper settling surface through a valve-controlled discharge pipe 17 and this pipe may be arranged to discharge material onto the bottom of the tank which constitutes the lower settling surface of the apparatus, as shown in Fig. 1 of the drawings, or to convey the same to a separate point of discharge exteriorly of the tank, as is illustrated in Fig. 4.

For the purpose of assisting the movement of the thickened matter to the points of discharge of the settling surfaces, I provide series of sweeps 18 which have a slow rotary movement above the said surfaces, in connection with a shaft 19 whose axis is coincident with that of the tank.

The shaft may be supported or suspended in any suitable manner and is at its upper end connected with a suitable driving mechanism which imparts a slow rotary movement thereto.

To conduct the discharge from the upper settling surface more directly to the sump in the bottom of the tank, the lower sweeps may carry a funnel 20 into wihch the conduit 17 delivers the thickened matter discharged from the upper settling surface 6.

In the modified construction shown in Fig. 3 the boot or collar is omitted and the thickened matter is discharged from the upper settling surface into the lower compartment.

Instead of regulating the discharge of liquid from the pocket of the lower compartment of the tank by means of a valve, the upwardly extending end of the pipe may be provided with a vertically adjustable sleeve 21 as shown in Fig. 2, to vary the static head and thereby accelerate or retard the outflow of liquid from the tank.

In the operation of the invention, the material fed into the upper portion of the tank by means of the central feed-box enter the lower compartment of the same through the passage 15. As the solids suspended in the liquids settle upon the surfaces provided by the bottom of the tank and the partition 5, the thinner liquid rises in the upper compartment to a level with the overflow launder 7 and in the lower compartment into the pocket 8 formed beneath the dished partition 5.

The slowly revolving sweeps promote the uniform movement of thickened matter to the outlets of the settling surfaces and the liquid accumulating in the pocket is discharged therefrom through the conduit 9.

The discharge of the solids at a desired density is regulated by means of the valves in the outlets 4 and 17 and the rate at which the material is fed into the lower compartment is established by accelerating or retarding the outflow of liquid from the pocket 8.

In the form shown in Fig. 1 this is accomplished by adjustment of the valve 10, and in the form shown in Fig. 2, by raising or lowering the sliding sleeve 21.

A settling tank constructed in accordance with my invention, with two or more settling surfaces, provides an efficient substitute for the series of tanks used heretofore to progressively thicken a charge of material in distinctive stages, and it is advantageous over this method of progressive thickening in that the materials immediately upon settling on the decks of the compartments into which the tank is divided are by the action of the sweeps, moved to the respective discharge openings and thence to the opening in the bottom of the tank through which the final product is discharged.

It has been found in practice that the thickened product which in the form of my invention shown in Fig. 3, falls by its specific gravity from the discharge-opening of each deck to the bottom of the container, does not mix to any serious extent with the thinner material through which it passes.

It has also been found that the gentle stirring action of the sweeps expedites the thickening process and increases the density of the final product and while the openings in the decks which connect the different compartments are provided primarily for the passage of downwardly moving material from one to the other, they also serve as conduits for upwardly flowing thin material, it having been found that as stated hereinbefore, pulps of different densities have little tendency to mix.

From the above statements based upon actual demonstrations, it will be understood that by proper proportioning of the different openings through which the material passes in the operation of the settling tank, the overflow conduits which connect with the compartments below the upper deck, may be eliminated, in which case the liquid flowing upwardly from each compartment through the passages in the decks, enters the space of the tank above the upper deck and is discharged therefrom across the overflow at the upper edge of the container.

Having thus described my improved thickening apparatus in its preferred forms, I desire it understood that other variations in the arrangement and construction of the parts thereof may be resorted to within the spirit of my invention as set forth in the following claims:

1. In apparatus for thickening the solids from fluid suspensions, a settling tank, upper and lower settling surfaces therein, means for the outflow of liquid rising from solids settling toward said surfaces, a regulatable outlet for the discharge of thickened matter from the lower surface, and a regulatable outlet for discharging thickened matter from the upper surface onto the lower surface.

2. In apparatus for thickening the solids from fluid suspensions, a settling tank, upper and lower settling surfaces therein, the upper surface adjoining the circumferential wall of the tank, means for the outflow of liquid rising from solids settling toward said surfaces, an outlet for the discharge of thickened matter from the lower surface, an outlet for discharging thickened matter from the upper surface, and sweeps having a movement above said surfaces to impel the thickened matter toward the respective outlets.

3. In apparatus for thickening the solids from fluid suspensions, a settling tank, upper and lower settling surfaces therein, means for the outflow of liquid rising from solids settling toward said surfaces, an outlet for the discharge of thickened matter from the lower surface, an outlet for discharging thickened matter from the upper surface, sweeps having a movement above said surfaces to impel the thickened matter toward the respective outlets, and a channel to receive the matter discharged through the outlet of the upper surface and conduct it to the lower surface.

4. In apparatus for thickening the solids from fluid-suspensions, a settling tank, upper and lower settling surfaces therein, the upper surface adjoining the circumferential wall of the tank, outlets for the restricted discharge of thickened matter from said surfaces, sweeps for moving settling matter toward said outlets, means for the discharge of liquid rising from solids settling in the space above the upper surface, a conduit for the discharge of liquid rising from solids settling in the space below the upper surface, and means for accelerating or retarding the flow of liquid through said conduit.

5. In apparatus for thickening the solids from fluid suspensions, a settling tank, upper and lower settling surfaces therein, the upper surface adjoining the circumferential wall of the tank, outlets for the restricted discharge of thickened matter from said surfaces, sweeps for moving settling matter toward said outlets, means for the discharge of liquid rising from solids settling in the space above the upper surface, a conduit for the discharge of liquid rising from solids settling in the space below the upper surface, and means for accelerating or retarding the flow of liquid through said conduit by varying the static head produced thereby.

6. In apparatus for thickening the solids from fluid suspensions, a settling tank, upper and lower settling surfaces therein, the upper surface adjoining the circumferential wall of the tank, outlets for the restricted discharge of thickened matter from said surfaces, sweeps for moving settling matter toward said outlets, means for the discharge of liquid rising from solids settling in the space above the upper surface, and a conduit for the discharge of liquid rising from solids settling in the space below the upper surface.

7. In apparatus for thickening the solids from fluid suspensions, a settling tank, upper and lower settling surfaces therein, the upper surface having an opening for the flow of material fed into the tank above the same, into the space above the lower surface, a collar surrounding the opening to restrain material settling toward the upper surface from passing through the opening, means for the outflow of liquid rising from solids settling toward said surfaces, and outlets for the restricted discharge of thickened matter from said surfaces.

8. In apparatus for thickening the solids from fluid suspensions, a tank, upper and lower settling surfaces therein, the upper surface having a passage for the flow of material into the space above the lower surface, means for the outflow of liquid rising from solids settling toward said surfaces, an outlet for the discharge of settling matter from the lower surface, and sweeps having a movement above said surfaces to impel settling matter toward said passage and said outlet.

9. In apparatus for thickening the solids from fluid suspensions, a tank, upper and lower settling surfaces therein, the upper surface having a passage for the flow of material into the space above the lower surface, an outlet for the discharge of matter settling toward the lower surface, a conduit for the outflow of liquid rising from solids settling toward the lower surface, means to accelerate or retard the flow of liquid through said conduit, and sweeps for moving settling material toward said passage, and said outlet.

10. In apparatus for thickening the solids from fluid suspensions, a tank, upper and lower settling surfaces therein, the upper surface having a passage for the flow of material into the space above the lower surface, regulatable means for the discharge of settling matter from said surfaces, and means for the outflow of liquid rising from solids settling toward said surfaces.

11. In apparatus for thickening the solids from fluid suspensions, a tank, upper and lower settling surfaces therein, the upper surface having a passage for the flow of material into the space above the lower surface, outlets for a restricted discharge of settling matter from said surfaces, sweeps having a movement above said surfaces to impel settling matter toward said outlets, and means for the outflow of liquid rising from solids settling toward said surfaces.

12. In apparatus for thickening the solids from fluid suspensions, a tank, upper and lower settling surfaces therein, the upper surface having a passage for the flow of material into the space above the lower surface, outlets for the restricted discharge of settling matter from said surfaces, sweeps having a movement above said surfaces to impel settling matter toward said outlets, and means for the outflow of liquid rising from solids settling toward said surfaces.

13. In apparatus for thickening the solids from fluid suspensions, a tank, upper and lower settling surfaces therein, the upper surface having a passage for the flow of material into the space above the lower surface, outlets for the restricted discharge of settling matter from said surfaces, a conduit for the outflow of liquid rising from solids settling toward the lower surface, and means to accelerate or retard the flow through said conduit.

14. In apparatus for thickening the solids from fluid suspensions, a tank, upper and lower settling surfaces therein, the upper surface having an opening for the flow of material into the space above the lower surface, a collar surrounding said opening to restrain material settling toward the upper surface from passing through the opening, outlets for the discharge of settling matter from said surfaces, sweeps for moving settling matter toward said outlets, and means for the outflow of liquid rising from solids settling toward said surfaces.

15. In apparatus for thickening the solids from fluid suspensions, a tank, upper and lower settling surfaces therein, the upper surface having an opening for the flow of material into the space above the lower surface, a collar surrounding said opening to restrain material settling toward the upper surface from passing through the opening, outlets for the discharge of settling matter from said surfaces, a conduit for the outflow of liquid rising from solids settling toward the lower surface, and means for accelerating or retarding the flow of liquid through said conduit.

16. In apparatus for thickening the solids from fluid suspensions, a tank, upper and lower settling surfaces therein, the upper surface having a passage for the flow of material into the space above the lower surface, means for the outflow of liquid rising from solids settling toward said surfaces, outlets separate from said passage for the discharge of settling matter from said surfaces, and a channel separate from said passage to receive matter discharged through the outlet of the upper surface and conduct it to the lower surface.

17. In apparatus for thickening the solids from fluid suspensions, a tank, upper and lower settling surfaces therein, the upper surface having a passage for the flow of material into the space above the lower surface, means for the outflow of liquid rising from solids settling toward said surfaces, outlets for the discharge of settling matter from said surfaces, sweeps for moving settling matter toward said outlets, and a channel to receive matter discharged through the outlet of the upper surface and conduct it to the lower surface.

18. In apparatus for separating solids from fluid suspensions, a tank, upper and lower settling surfaces therein, an opening for the flow of material from one surface to another, a collar surrounding said opening to restrict material settling toward the upper surface from passing through the opening, outlets for the discharge of settled matter from each surface, means for the outflow of liquid from the spaces above said surfaces, and sweeps for moving settling matter toward said outlets.

19. In apparatus for separating solids from fluid suspensions, a tank, upper and lower settling surfaces therein, a passage for the flow of material from one surface to another, outlets for the discharge of settled matter from each surface, means for the outflow of liquid from the spaces above said surfaces, and sweeps for moving settling matter toward said outlets.

20. In apparatus for thickening the solids from fluid suspensions, a tank, upper and lower surfaces therein, the upper surface having a passage for the flow of material into the space above the lower surface, means for the outflow of liquid rising from solids settling toward said surfaces against predetermined resistances or heads, an outlet for the discharge of settling matter from the lower surface and sweeps for moving matter settling toward the lower surface, to said outlet.

21. In apparatus for separating solids from fluid suspensions, a settling tank, upper and lower settling surfaces therein, the upper surface having an opening for the flow of material fed into the tank above the same, into the space above the lower surface, means for the outflow of liquid rising from solids settling toward said surfaces, and outlets separate from said opening for the restricted discharge of thickened matter from said surfaces.

22. In apparatus for separating solids from fluid suspensions, a settling-tank having upper and lower settling surfaces, a passage for the flow of material fed into the tank above the upper surface, into the space above the lower surface, means for the outflow of liquid rising from solids settling toward said surfaces, and outlets separate from said passage for the restricted discharge of thickened matter from said surfaces.

23. In apparatus for separating solids from fluid suspensions, a settling tank having upper and lower settling surfaces, a passage for the flow of material fed into the tank above the upper surface, into the space above the lower surface, means for the outflow of liquid rising from solids settling toward said surfaces, outlets for the discharge of thickened matter from said surfaces, and sweeps having a movement above the surfaces to impel the thickened matter toward the respective outlets.

24. In apparatus for thickening solids from fluid suspensions, a settling tank, decks dividing said tank into a plurality of superposed compartments and having openings for the passage of material from one compartment into another, an outlet for the discharge of thickened product from the lowest compartment, sweeps for moving material toward said passages and said outlet, and an overflow for the discharge of thin liquid from the space above the upper deck.

25. In apparatus for thickening solids from fluid suspensions, a settling tank, decks dividing said tank into a plurality of superposed compartments and having openings for the passage of material from one compartment into another, a regulatable outlet for the discharge of thickened product from the lowest compartment, sweeps for moving material toward said passages and said outlet, and an overflow for the discharge of thin liquid from the space above the upper deck.

In testimony whereof I have affixed my signature in the presence of two witnesses.

ALFRED L. BLOMFIELD.

Witnesses:
MARY C. CLARK,
JESSE E. WOODS.